(12) United States Patent
Murphy et al.

(10) Patent No.: US 11,775,380 B2
(45) Date of Patent: Oct. 3, 2023

(54) DATA PROCESSING SYSTEMS

(71) Applicant: Arm Limited, Cambridge (GB)

(72) Inventors: Nicholas John Nelson Murphy, Farnham (GB); Jussi Tuomas Pennala, Trondheim (NO); Andreas Adamidis, Cambridge (GB); Benjamin Charles James, Red Lodge (GB)

(73) Assignee: Arm Limited, Cambridge (GB)

( * ) Notice: Subject to any disclaimer, the term of this patent is extended or adjusted under 35 U.S.C. 154(b) by 55 days.

(21) Appl. No.: 17/156,443

(22) Filed: Jan. 22, 2021

(65) Prior Publication Data
US 2022/0147416 A1 May 12, 2022

(30) Foreign Application Priority Data
Nov. 12, 2020 (EP) ..................................... 20386051

(51) Int. Cl.
*G06F 11/10* (2006.01)
*G06F 12/0804* (2016.01)

(52) U.S. Cl.
CPC ...... *G06F 11/1004* (2013.01); *G06F 12/0804* (2013.01); *G06F 2212/1008* (2013.01)

(58) Field of Classification Search
CPC ............. G06F 11/1004; G06F 12/0804; G06F 2212/1008
See application file for complete search history.

(56) References Cited

U.S. PATENT DOCUMENTS 5,455,834 A * 10/1995 Chang ................. G06F 11/1008
714/768
2016/0344731 A1* 11/2016 Serebrin ............... H04L 63/164

* cited by examiner

*Primary Examiner* — Shelly A Chase
(74) *Attorney, Agent, or Firm* — Vierra Magen Marcus LLP

(57) ABSTRACT

A data processing system comprises a memory, a processing unit, a MMU operable to process memory transactions for the processing unit; and an error-detecting circuit located between the MMU and the memory. The MMU is configured to determine from respective memory address mappings corresponding memory addresses to which memory transaction applies. The determined memory addresses comprise a first part representing a memory location and a second part representing an error-detecting code generated using the first part of the memory address. The error-detecting circuit can then check using the error-detecting code for the memory address whether the memory address received by the error-detecting circuit is valid.

20 Claims, 4 Drawing Sheets

DATA PROCESSING SYSTEMS

BACKGROUND

The technology described herein relates to data processing systems including processing units (such as graphics processing units (GPUs)), and in particular to the operation of such data processing systems when being used in environments where the operation of the data processing system is required to be "functionally safe", such as may be the case for data processing systems being used for a human machine interface (HMI), such as in automotive or medical environments.

It is becoming increasingly common for data processing units and data processing systems to be used to process data for use in environments where it is important, e.g. for safety reasons, that the processing output is correct.

For example, a graphics processor and graphics processing system may be used to render images for displaying to a driver of a vehicle, for example for a cockpit display, or as a mirror replacement system. In such situations, any errors in the images rendered by the graphics processor can have safety implications for the driver of the vehicle and/or for other people in or in proximity to the vehicle, and so it is important that the images rendered by the graphics processor are correct.

The Applicants believe that there remains scope for improvements to the operation of data processing systems, for example when being used for such safety-critical applications.

BRIEF DESCRIPTION OF THE DRAWINGS

Embodiments of the technology described herein will now be described, by way of example only, and with reference to the accompanying drawings, in which.

Like reference numerals are used for like features throughout the drawings, where appropriate.

DETAILED DESCRIPTION

Figure 1:
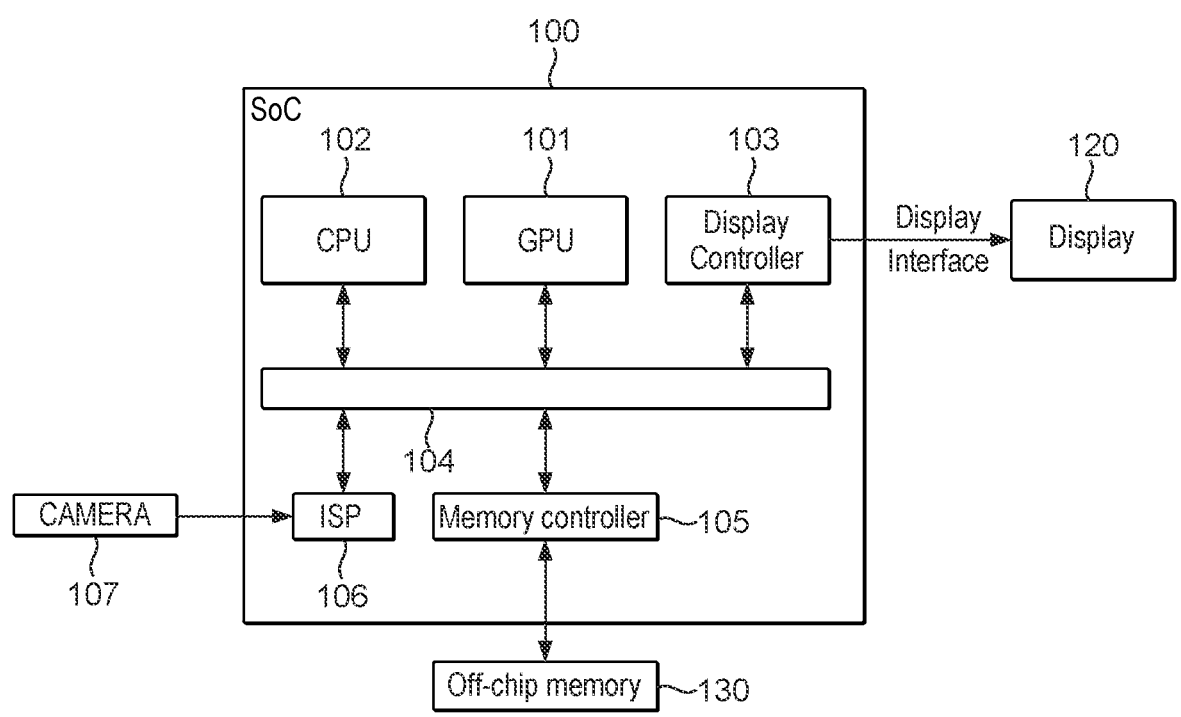
FIG. 1 shows an embodiment of a data processing system.

A first embodiment of the technology described herein comprises a data processing system comprising:
a memory;
a processing unit;
a memory management unit (MMU) operable to process memory transactions for the processing unit; and
an error-detecting circuit located between the MMU and the memory;
wherein the MMU is configured, for a memory transaction for the processing unit, to determine, from a respective memory address mapping for the memory transaction, a corresponding memory address to which the memory transaction applies,
wherein the determined memory address comprises a first part representing a memory location to which the memory transaction applies and a second part representing an error-detecting code that has been generated for the memory address using the first part of the memory address; and
wherein the memory address determined by the MMU is subsequently provided to the error-detecting circuit, wherein the error-detecting circuit is configured to check, using the error-detecting code for the memory address, whether the memory address received by the error-detecting circuit is valid.

A second embodiment of the technology described herein comprises a method of operating a data processing system, the data processing system comprising:
a memory;
a processing unit;
a memory management unit (MMU) operable to process memory transactions for the processing unit; and
an error-detecting circuit located between the MMU and the memory;
the method comprising:
for a memory transaction for the processing unit:
the MMU determining, from a respective memory address mapping for the memory transaction, a corresponding memory address to which the memory transaction applies,
wherein the determined memory address comprises a first part representing a memory location to which the memory transaction applies and a second part representing an error-detecting code for the memory address that has been generated using the first part of the memory address; and
the memory address obtained by the MMU subsequently being provided to the error-detecting circuit, and the error-detecting circuit checking, using the error-detecting code for the memory address, whether the memory address received by the error-detecting circuit is valid.

The technology described herein relates generally to data processing systems including a processing unit (or a set of one or more processing units) in communication with a memory wherein, during the processing of data by the processing unit (or set of processing units), data may be transferred from the processing unit(s) to the memory, and vice versa, and wherein such memory transactions are processed by a memory management unit (MMU) associated with the processing unit.

Thus, in the technology described herein, for a memory transaction initiated by the processing unit, the MMU is configured to determine from a respective memory address mapping for the memory transaction (e.g. from a respective memory page table storing the memory address mappings) a corresponding memory address (e.g. corresponding to a single page table entry) to which the memory transaction applies.

Such memory transactions are normally (and in an embodiment are also in the technology described herein) protected against faults by protecting the memory address mappings, e.g. by protecting the page table entries themselves. Various memory protection arrangements are possible in this regard.

However, for safety-critical applications, where a higher level of functional safety is desired (or required), such as may be the case for processing systems being used for a human machine interface (HMI), such as in automotive or medical environments, the relevant functional safety standards (e.g. the 'ASIL' standard for automotive applications) typically require that the system is able to handle various (e.g. all) different types of faults that may occur in operation.

In this regard, the technology described herein recognises that existing memory protection arrangements may not be able to adequately handle certain types of "transient" faults that may occur within the data processing system, e.g., and especially, transient faults affecting the logic in or after the MMU which may lead to erroneous memory transactions, if not appropriately handled.

For example, a "transient" fault occurring in or after the processing unit's associated MMU during a memory write operation, where (a set of) data is to be written out from the processing unit to memory, can potentially cause data to be erroneously written out from the processing unit to the wrong memory location, or cause the wrong data to be written into the correct memory location.

In some cases this may be tolerable, e.g., where the error only concerns a data structure that is generated and used in a "one-off" manner, e.g. for a single instance of processing (e.g. a data structure for a single frame being rendered by a graphics processing unit), such that the error does not propagate to subsequent processing operations (e.g. for subsequent frames).

However, the technology described herein recognises that when a transient fault causes an erroneous memory write operation that affects a "persistent", or permanent, data structure in memory, e.g. a data structure that may be used across multiple instances of processing (e.g. a data structure that may be used for the rendering of multiple frames), the error could in that case potentially corrupt any and all subsequent processing operations using that data structure, e.g. such that in the worst case the fault may be irrecoverable, e.g. such that a system reset may be required.

Correspondingly, a transient fault occurring during a memory read operation may cause data to be read in from the wrong memory location, which may cause the wrong data to be processed. For example, for a graphics processor, this may mean that the wrong frame (or wrong frame content) is generated for display, such that the display is incorrect.

The technology described herein is thus particularly concerned with the detection of such transient faults, e.g., and especially, those that lead to errors that may impact memory transactions between the processing unit and memory.

To be able to handle such faults, the technology described herein thus provides an error-detecting circuit that is located (logically) between the MMU and the memory, and that is configured to check, for a (and each) memory transaction initiated by the processing unit, that the corresponding memory address for which the memory transaction applies is valid before the memory transaction is allowed to proceed.

In this way, by providing such error-detecting circuit at this position, the technology described herein is able to detect and protect against errors affecting the logic after the memory address lookup, e.g., including errors in the MMU itself, as well as errors in any local storage (such as errors in a (e.g. L2) cache, e.g. where data is transferred to/from memory via a cache system), errors in the processing unit's internal interconnects, and/or any errors in any other processing units that may be provided between the MMU and the writing out of the data to (external) memory (and that may therefore operate using the memory address determined by the MMU, e.g. rather than a "virtual" address), so that these errors can be flagged accordingly, e.g. so that the data processing system can perform appropriate error handling, if required.

It will be appreciated that the error-detecting circuit in the technology described herein is logically located between the MMU and the memory. However, the error-detecting circuit does not need to be physically located between the MMU and the memory (although it may be, if that is desired).

The Applicants have further recognised that the error checking operation for the technology described herein can be facilitated by configuring the memory addresses to carry an error-detecting code through the system to the error-detecting circuit.

Thus, as will be explained further below, in the technology described herein, a first part of the memory address (e.g. a first set of bits in the address field) is used to represent a (physical) memory location, e.g. in the normal manner, whereas a second part of the memory address (e.g. a second set of bits) is used to store a value or set of values for an error-detecting code such that the error-detecting code is carried through the system as part of the memory address itself.

The error-detecting code is therefore provided by the MMU together with (as part of) the memory address for the memory transaction, which memory address, including the error-detecting code, can then be provided to the error-detecting circuit for checking that the memory address is valid.

A benefit of this approach is that, because the error-detecting code is stored using a part of the memory address, the operation of the MMU to determine the respective memory address mapping, and the corresponding memory address to which the memory transaction applies, etc., can be performed as normal, e.g. since for the purposes of determining the memory address the MMU will see the memory address as a 'normal' memory address (and the MMU itself need not (and in an embodiment does not) have any knowledge that the memory address is configured to include an error-detecting code). For instance, the memory addresses (and mappings) can be configured in this way, e.g. in advance of the processing, e.g. by a (software) driver for the processing unit. However, after the memory addresses (and mappings) have been configured in this way and stored for use by the processing unit, they can then be (and are) handled by the MMU as 'normal' memory addresses, e.g. at least until they arrive at the error-detecting circuit.

This means that in embodiments no significant hardware modification of the MMU or processing unit is required, other than the addition of the error-detecting circuit.

In this way, the technology described herein may thus provide a particularly efficient (cheap) mechanism, e.g. without requiring significant additional hardware and/or area, for detecting transient faults that have impacted the logic in or after the MMU and that may cause erroneous memory transactions, e.g. as described above. The technology described herein is therefore particularly beneficial for safety-critical applications, such as in automotive or medical environments, where it is desired (or required) to be able to handle such faults, and wherein such faults might otherwise not easily be detected.

For example, in contrast to the "transient" faults that the technology described herein is particularly concerned with, a "permanent" fault affecting the processing unit can be detected by periodic run-time testing of the system (and in embodiments this is done). Accordingly, in an embodiment, the processing unit and system is also operable to and configured to (and operates to) detect the presence of "persistent" faults in its operation. This can be done in any suitable and desired manner, such as, and in an embodiment, by the use of appropriate built-in self-testing (BIST) mechanisms and circuits. Other arrangements would, of course, be possible.

However, such periodic (e.g. BIST) testing may not be effective at detecting transient faults. For instance, in contrast to permanent faults, transient faults cannot reliably be detected by BIST, e.g. since they may have resolved themselves by the time the next test is performed.

As mentioned earlier, some transient faults can potentially be ignored, e.g. if the data is being generated in a "one-off" manner. For example, this may often be the case for a graphics processor, as the graphics processor may, and typically will, be configured to render frames, one after another, with the data generated for each frame written, e.g., into a frame buffer, e.g. for display. If a transient error corrupts the frame buffer for the current frame (only), the frame buffer will anyway be redrawn for the next frame, and the error will not propagate. Further, at least where the graphics processor is operated to render frames for display at a sufficiently high 'refresh' rate (e.g. 60 frames per second or higher) the error may in any event barely be perceptible to the human eye, so long as the next frame appears correctly. Thus, in such cases, the error can potentially be ignored.

That is, some faults may cause errors in data structures that are to be used (e.g. displayed) in a one-off manner, such that any error due to the presence of a fault will be present in a single instance only, e.g. in the single instance of the frame using that data structure. Faults in such "one-off" data structures (e.g. frames) can be avoided, e.g., by having the processing unit generate the data structures being used (e.g. render the frames being displayed) at a sufficiently fast rate to avoid any faults persisting for longer than a desired "fault tolerant" time window.

This will not normally be an issue in a graphics processor where the frames are to be refreshed for display in any event, e.g. because the information that they are displaying is changing.

On the other hand, as mentioned above, the technology described herein recognises and is particularly concerned with the possibility of errors caused by "transient" faults that may affect data structures in memory that persist across multiple frames, e.g. such that an error that is introduced when generating the data structure may be propagated to more than just one frame because the data structure will be used when generating other frames as well.

This may be the case, for example, where a graphics processing unit is being used to render a texture, which will then be used as a texture when rendering subsequent frames (e.g. in a so-called "render-to-texture" operation). In addition to texture reads, other examples of data structures that may persist across frames might include command buffers, vertex buffers, etc. However, various other examples are also contemplated and the technology described herein may beneficially be used to detect these types of errors affecting persistent data structures in whatever context they occur.

While it would in such cases again be possible to re-generate the persistent data structure periodically, e.g. so that a new version of the data structure is generated at least once in a given "fault tolerant" time interval, the Applicants have recognised that that may in general place an undesirable burden on the processing resources and time of the graphics processor, and/or increase application complexity (e.g. in terms of having to periodically submit the data for re-processing).

It would also be possible to protect at least some of the data structures in memory against faults, e.g. by configuring them so that the processing unit (e.g. graphics processor) has 'read-only' access, and in an embodiment this is also done in the technology described herein. However, it may not be possible or desirable to protect all data structures in memory in this way. Furthermore, the error-checking of the technology described herein beneficially provides another level of protection. For instance, in some embodiments, at least some data structures may be marked as read-only to protect against any errors in the logic before the MMU. The error-checking of the technology described herein can then be applied in addition to such write protection to ensure that the write protection remains valid.

In contrast, by providing an error-detecting circuit that is configured to perform an error check on the memory address after the memory address (mapping) has been determined by the MMU, but before the memory transaction has completed, the technology described herein provides a relatively simpler mechanism for detecting such errors, in an embodiment with minimal additional hardware and/or area required (e.g. in an embodiment it is only the error-detecting circuit that is added and the logic before the error-detecting circuit including the MMU, etc., is otherwise operated as normal).

Thus, the technology described herein may provide various improvements compared to other approaches.

The processing unit may be any suitable and desired form of processing unit. In an embodiment, the processing unit is a processing unit that is intended to perform particular forms of processing operation, and in particular that, in an embodiment, functions as a hardware accelerator for a particular form or forms of processing operation. Thus the processing unit may, for example, be any suitable and desired form of processing unit and accelerator, such as a video processing unit, a machine learning accelerator, a neural network processing unit, etc.

In an embodiment, the processing unit is a graphics processing unit (graphics processor, GPU). In this case, the graphics processing unit of the data processing system can comprise any suitable and desired form of graphics processing unit. The graphics processing unit may perform any suitable and desired form of graphics processing, such as rasterisation-based rendering, ray-tracing, hybrid ray-tracing etc.

In this regard, as mentioned above, the technology described herein recognises that even in graphics processing operations where the framebuffer is typically redrawn for each frame, such that transient faults may normally be ignored, e.g. as any errors may be expected to be resolved when the framebuffer is redrawn for the next frame, there is still a potential problem where such transient faults lead to erroneous memory transactions (particularly erroneous memory write operations) which impact "persistent" data structures in memory, and that these faults may therefore still need to be handled, e.g., and especially, for safety-critical applications (and the technology described herein thus provides an improved mechanism for handling such faults).

This being the case, the technology described herein will be described below primarily with reference to the processing unit being a graphics processing unit. However, unless the context requires otherwise, the described features of the technology described herein can equally and analogously be applied to and used for other forms of processing unit, and the technology described herein extends to such systems using forms of processing unit other than graphics processing units.

The technology described herein can be used for all forms of output that data processing units may output. Thus, in the case of graphics processing units, it may be used when generating frames for display, render-to-texture outputs, etc. However, the technology described herein can equally be used where the graphics processing units are to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations.

The data processing system may include a single processing unit which may comprise a single or plural processing cores.

It would also be possible for the processing unit to form part of a set of one or more, in an embodiment plural, processing units that may, e.g., be arranged in a group.

In that case some, and in an embodiment all, of the processing units of the plurality of processing units in the group are operable to generate a data processing output, e.g. frame, on their own (i.e. independently of any other processing unit of the plurality of processing units).

However, it would also be possible for one or more of the processing units in the group to be operable in combination with at least one other processing unit in the group such that respective sets (or sub-groups) of one or more processing units of the plurality of processing units can generate respective data processing outputs.

Thus, in embodiments, the data processing system of the technology described herein can generate a data processing output, e.g. frame for display, using a set of only a single one of the plurality of processing units (that is operating independently), or using a set of plural ones of the plurality of processing units (that are operating in combination).

In that case, each processing unit may have an associated host processor (virtual machine) for which it is performing processing work for, and in an embodiment an associated hypervisor or arbiter that is able to allocate jobs to the processing unit or units.

Communications between processing units that are operating in combination can take any suitable form. In an embodiment, there is a master-slave relationship between communicating processing units.

However, other arrangements would be possible.

As mentioned above, the processing unit (or set of processing units) is in communication with a memory, which may e.g., and in an embodiment is, memory that is external to the processing unit, e.g. main (system) memory. In use, data may be transferred between processing unit and the memory. According to the technology described herein, such memory transactions are controlled by a MMU associated with the processing unit.

The MMU may be part of the processing unit, e.g. may be located "on-chip". Thus, in embodiments, the processing unit comprises the MMU. However, it is also contemplated that the MMU may be external to the processing unit, e.g. as it may be shared between a set of processing units, for instance.

The MMU controls access to the memory whenever memory is accessed, e.g. in the normal manner for a MMU. For instance, when the processing unit initiates a memory transaction for data to be transferred from the graphics processor to memory (or vice versa), the MMU then determines a respective memory address mapping for the memory transaction, and determines from the memory address mapping a corresponding memory address to which the memory transaction applies.

The MMU determining the memory address typically comprises translating a "virtual" address provided by the processing unit into a physical memory address representing a location in the (external) memory. For example, all memory addresses that are issued by software and operated on by the processing unit may be "virtual" memory addresses. A virtual address must therefore be translated to a physical address before a memory access can take place (because the processing unit must know which physical memory location is being accessed). When the processing unit is attempting to transfer data to/from memory, the processing unit thus provides the virtual memory address for the data to the MMU, which then determines from the respective memory address mapping the corresponding physical memory address.

The memory address mappings (and memory addresses) are in an embodiment stored in a suitable page table, which in an embodiment resides in the (external) memory. The MMU can thus obtain the required memory address (mappings) from their storage, e.g. in memory, as and when memory transactions are initiated, e.g. in the usual fashion.

(In some embodiments, in order to speed up memory address retrieval, recent memory addresses may be stored in more local storage, e.g. a memory address translation cache (translation lookaside buffer, TLB) such that the MMU is configured to obtain memory addresses via the memory address translation cache. Thus, in embodiments, the MMU may first check the cache (translation lookaside buffer, TLB) for a recently used cached memory address translation. If the MMU does not find a recently cached memory address translation, the, e.g. table walk unit reads the appropriate table entry, or entries, from memory.)

The memory address lookup (translation) may comprise a single level of lookup or may comprise multiple levels of lookup.

For example, in some embodiments, two-level memory addressing may be used. In that case, the memory addresses are divided into two 'levels', e.g. with a first address indexing 'blocks' of memory space at a first level, and the second address indexing (at a second, finer level) sub-locations within the first level blocks. Thus, there may be a first memory management unit (MMU) that translates an input virtual address to an "intermediate" (first level) memory address, e.g. that indexes a particular 'block' of address space, and a second (or system) memory management unit (sMMU) that determines a final (second level) memory address indexing a particular location within the first level block of address space.

In this case, the memory lookup may be performed in multiple, e.g., two steps. For example, in a first step, the MMU may determine an intermediate (first level) physical memory address for the data, and the 'final' (second level) physical memory address may be determined in a subsequent step.

The use of multi-level memory addressing may be particularly beneficial in the technology described herein since, as mentioned above, a part of the (intermediate) memory address field is, in effect, repurposed to store the error-detecting code. This means that fewer bits are available to represent the actual memory location. Thus, where a part of the (intermediate) memory address is used to store the error-detecting code, there may be a smaller (intermediate) memory address range. However, by using multiple (e.g. two) levels of memory addressing, it can be ensured that all memory locations can still be addressed.

In general the memory addressing may be performed over more than two levels, if required.

In such cases, the error-detecting circuit described above is in an embodiment located (logically) after the first MMU, such that the error check is performed using the (first level) "intermediate" memory address (and such that it is the intermediate memory address that is configured to carry the error-detecting code). In this way the error-detecting circuit is able to protect all of the logic after and including the first MMU.

In an embodiment, where two-level addressing is used, the error-detecting circuit is located (logically) between the first and second level MMUs.

However, it would also be possible to perform such or additional error checks at other positions between the (first) MMU and the memory, and in general the (or an) error-detecting circuit may be positioned at any logical position between the (first) MMU and the memory.

In some embodiments multiple error-detecting circuits may be provided in order to test the memory addresses at different points within the data processing system.

According to the technology described herein, the (intermediate) memory addresses are stored (e.g. in memory, e.g. in a suitable memory page table) in the format as described above such that each memory address contains a first part representing an associated memory location, etc., and a second part representing an error-detecting code that has been generated using the first part.

In particular, a value or set of values for the error-detecting code represented by the second part of the memory address is according to the technology described herein generated using the other (the first) part of the memory address, e.g. using at least a subset of bits from the (first) part of the memory address that represents the (physical) memory location.

In an embodiment the value or values for the error-detecting code are also generated using the memory (read/write) access permissions associated with the memory address. That is, the value or values for the error-detecting code are in an embodiment generated using the first part of the memory address and the access permissions for the memory address.

For instance, in addition to the memory address itself (containing the first and second parts), the memory address mapping in an embodiment also includes one or more other fields, e.g. representing associated memory (read/write) access permissions, etc., for the memory location. In general the memory address mapping for a given memory address may contain any other suitable and desired fields for storing any other state or information associated with the memory address that may be required by the data processing system (e.g. a shareability field, a cacheability field, etc.). These other fields will typically not be carried through the data processing system with the memory address (although that could be done, if desired).

The generation of the error-detecting code may also generally take into account any other such information or fields in the memory address mapping. However, in an embodiment, the error-detecting code is generated using only the first part of the memory address and its access permissions (and not using any other data that may be stored in the memory address mapping (page table entry)).

For instance, in an embodiment, the value or set of values for the error-detecting code for a memory address is generated using (and in an embodiment only using) the first part of the memory address as well as a bit value representing whether or not a write permission has been set for the memory address. In an embodiment the error-detecting code comprises a set of one or more (in an embodiment plural, e.g. three) respective error-detecting code bits that have been derived for respective, different (in an embodiment unique) subsets of bits from the first part of the memory address in combination with the write permission bit value.

In that case, the values for the error-detecting code bits are in an embodiment set such that the error-detecting circuit can perform an error check (such as a parity check, as will be explained further below) using each error-detecting code bit in combination with the respective address bits for which it was derived (i.e. using the first and second parts of the memory address) to determine whether the memory address is valid. By generating the error-detecting code using the write permissions the error check is in an embodiment also operable to determine whether the write permission has been set, e.g. as will be explained further below.

However, other error-detecting arrangements would be possible and in general any suitable error-detecting code or codes may be used, as desired. For example, in embodiments, the error-detecting code may generally comprise (e.g.) a suitable cyclic redundancy check, checksum, hash, or any other suitable and desired representative value that can be generated using at least the first part of the memory address and then used in the manner described herein for checking that the (first part of the) memory address is valid (and in embodiments for also checking whether the write permission has been set).

The memory addresses (mappings) are stored in this format, e.g. in memory, e.g. in a suitable memory page table, such that the memory address for a given memory transaction can accordingly be (and is) determined by the MMU in this format, i.e. already including the error-detecting code. In other words, when the processing unit initiates a memory transaction, e.g. for writing out (a set of) data to memory (or reading in data from memory), such that the MMU will proceed to determine, from the respective memory address mapping, a corresponding memory address to which the memory transaction applies, the memory address that is determined by the MMU already includes the error-detecting code.

After the memory address has been determined by the MMU, the determined memory address, including the error-detecting code, is subsequently provided to the error-detecting circuit for checking that the memory address (and more particularly for checking that the first part of the memory address) is valid, before the memory transaction is allowed to proceed.

The error-detecting circuit is thus configured to receive the determined memory address from the MMU and to then check whether or not the received memory address is 'valid', e.g. to check that the memory address has not been corrupted/modified due to an error in the graphics processor and/or MMU.

The determination of whether the memory address is valid is performed using the error-detecting code (i.e. using the second part of the memory address).

For example, and in one illustrative embodiment, the error-detecting circuit is configured to check whether the memory address is valid by generating using the first part of the memory address determined by the MMU a value for the error-detecting code represented by the second part of the memory address; and then comparing the second part of the memory address provided by the MMU with the corresponding value for the error-detecting code generated by the error-detecting circuit to determine whether the memory address is valid.

In that case, the error-detecting circuit should thus be able to, and in an embodiment can, parse (and decode) the memory addresses received from the MMU in order to determine the respective first and second parts. The error-detecting circuit can then (and in an embodiment does) extract the first part of the memory address provided by the MMU and generate its own value for the error-detecting code represented by the second part of the memory address accordingly, using the first part of the memory address. The value for the error-detecting code generated by the error-detecting circuit can then be (and in an embodiment is) compared with the second part of the memory address as obtained/provided by the MMU to determine whether the memory address is 'valid', e.g. to check that the memory address has not been corrupted/modified due to an error in the graphics processor and/or MMU.

For example, when the value of the error-detecting code generated at the error-detecting circuit matches the value of the second part of the memory address provided by the MMU, it is then determined that the memory address is valid. In that case, the memory transaction can proceed as normal, and in an embodiment therefore does, e.g. with the memory transaction being provided to a memory controller, e.g. that controls the write/read operation to cause the data to be written to/read from the determined memory address.

On the other hand, when the value of the error-detecting code generated at the error-detecting circuit does not match the value of the second part of the memory address provided by the MMU, e.g. which may be because an error that has corrupted the memory address has occurred during or after the memory address lookup, it is then determined that the memory address is invalid. This determination can be suitably indicated, e.g., and in an embodiment, to cause the data processing system to perform an appropriate error-handling operation.

However, this is merely one example of how the error check can be performed. For instance, rather than the error-detecting circuit explicitly regenerating the error detecting code, the error-detecting circuit may instead be configured to perform some other operation on the memory address, e.g. that achieves the same effect of checking that the memory address is valid.

For example, and in one embodiment, the error-detecting circuit is configured to check whether the memory address provided by the MMU is valid by performing a parity check using the first and second parts of the memory address. In that case it is only the memory address itself that needs to be carried through the system, and there is no need to carry through the (e.g.) access permissions, or any other such information that may have been used to generate the error-detecting code (and in an embodiment therefore such information is not carried through the data processing system).

It will be understood that a parity check generally determines whether the number of '1's (the number of "set" bits) in an input is odd or even. Thus, by setting the values of the error-detecting code bits appropriately such that a parity check using the combination of the error-detecting code bit and the set of address bits for which it is derived for should always be odd (or even, depending on how the parity check is configured), it is possible in this way to determine whether the memory address is valid, and in an embodiment also whether or not the write permission has been set, using a parity check.

An implementation according to an embodiment will now be described. However, it will be appreciated that this example is merely provided for illustrative purposes and that the parity checks (and indeed error checks generally) can be performed in any other suitable and desired fashion.

In an embodiment, the second part of the memory address comprises a set of (e.g. three) error-detecting code bits, the values of which have been generated using respective, different (in an embodiment unique) subsets of bits from the first part of the memory address, and in an embodiment also using a write permission bit indicating whether or not a write permission is set for the memory address, e.g. as described above.

The error checking in an embodiment then comprises determining a corresponding set of (e.g. three) error values using the respective error-detecting code bits. In particular, the error values may be determined by performing a parity check using the combination of a respective one of the error-detecting code bits in the second part of the memory address with the (sub)set of address bits from the first part of the memory address for which the error-detecting code bit was derived.

In this case, the value for each error-detecting code bit may be set accordingly to ensure that for a normal (error free) memory address the combination of the error-detecting code bit with the set of address bits from the first part of the memory address for which the error-detecting code bit was derived will "pass" the parity check (e.g. to ensure that for a normal (error free) memory address the number of '1's (set bits) in the combination of the error-detecting code bit with the set of address bits from the first part of the memory address for which the error-detecting code bit was derived will be even (or, in another possible implementation, will be odd)).

For example, the error-detecting code bit may be set to '1' if there are an even number of '1's in the set of bits (the address bits and the write permission bit) for which it is being derived.

The effect of this is that if the write permission bit is set (to '1'), when the error-detecting code bit is combined with its respective set of address bits for the error checking, the combination should (in an error free operation) contain an even number of '1's.

Conversely, if the write permission bit is not set, the combination of the error-detecting code bit with its respective set of address bits should (in an error free operation) contain an odd number of '1's.

Thus, when testing the parity of the combinations during the error-checking, if the write permission was set, the parity check should be even for a valid memory address. This also has the effect of determining that the write permission bit was set. Thus, for a memory write operation, the memory address is in an embodiment determined to be valid when all of the error checks performed in this way are even (indicating an even number of '1's (set bits) for the combination of the error-detecting code bit with the respective (sub)set of address bits).

On the other hand, if the write permission was not set, when doing the error check using the combination of the error-detecting code bit and the address bits it was derived for, the effect of the above is that the error check should always be odd for a valid memory address. For a memory read operation it does not matter whether or not the write permission bit was set and so both situations may be determined to be valid. For a memory read operation, the memory address is accordingly in an embodiment determined to be valid when all of the error checks performed in this way are even or when all of the error checks are odd.

Thus, the error-detecting circuit may be configured to perform different error checks depending on whether the memory transaction relates to a memory write or memory read operation.

Of course this embodiment is just one example and various other suitable arrangements would be possible for using the error-detecting code provided as part of the memory address in order to check the memory address is valid (and in an embodiment to also check whether a write permission has been set), and the error-detecting code can thus be generated accordingly to facilitate the error check whatever it may comprise.

In this way, through the provision of the error-detecting circuit, regardless of the details of how the error check is performed, the technology described herein is able to detect instances where an error in the logic in or after the MMU may result in an erroneous memory write operation, and to flag this up accordingly.

As mentioned above, the configuration of the memory addresses (mappings, the memory page table) is in an embodiment performed in advance of the processing, in an embodiment by a software driver for the processing unit. Once the page tables have been configured in this way, the memory addresses (mappings) are then stored (e.g. in memory) in the format described above, and so can be processed and obtained by the MMU in this format (including the error-detecting code) when required. Thus, in embodiments, the error-detecting codes that are stored as part of the memory addresses are in an embodiment generated by the software driver, e.g., and in an embodiment, during the initial configuration of the memory addresses and memory address mappings (memory page tables).

It is believed that configuring the memory addresses in this way is also novel and inventive in its own right.

Another embodiment of the technology described herein comprises an apparatus for configuring a set of memory address mappings for use by a memory management unit (MMU) associated with a processing unit of a data processing system, the apparatus comprising:
 a memory address mapping circuit configured to determine, for each of a plurality of virtual addresses to be used by the processing unit, a respective mapping to a corresponding physical memory location; and
 a memory address generating circuit configured to generate a memory address for the physical memory location to which the memory address mapping applies, wherein the generated memory address comprises a first part representing the physical memory location and a second part representing an error-detecting code that has been generated for the memory address using the first part.

A further embodiments of the technology described herein comprises a method of configuring a set of memory address mappings for use by a memory management unit (MMU) associated with a processing unit of a data processing system, the method comprising:
 determining, for each of a plurality of virtual addresses to be used by the processing unit, a respective mapping to a corresponding physical memory location; and
 generating a memory address for the physical memory location to which the memory address mapping applies, wherein the generated memory address comprises a first part representing the physical memory location and a second part representing an error-detecting code that has been generated for the memory address using the first part.

Once the memory addresses (mappings) have been configured in this way, they can then be (and are) stored, e.g. in memory, e.g. in a suitable page table, such that they can be used by the processing unit.

The error-detecting code in these embodiments can be determined using the first part of the memory address in any suitable manner such that the error-detecting code can be used to check that the memory address is valid. In an embodiment the error-detecting code is also generated using the access (read/write) permissions for the memory address, and in an embodiment such that the error-detecting code can be used to determine whether or not a write permission has been set, e.g., and in an embodiment, in accordance with the embodiments described above.

In the technology described herein, as explained above, after the memory addresses (mappings) have been configured in this way, e.g. by the software driver, to include the error-detecting code, the memory addresses are then handled as 'normal' memory addresses (e.g. for the purposes of the MMU determining the memory address mappings and memory addresses, etc.).

In this way the memory address is handled by the MMU as a 'normal' memory address, e.g. in the normal manner for the MMU, without any regard for the fact that the memory address includes the error-detecting code, such that the error-detecting code is carried through the post-MMU logic as part of the physical address.

However, according to the technology described herein, after the MMU has determined a respective memory address for a memory transaction, rather than simply allowing the memory transaction to proceed as normal, the memory address is first provided to the error-detecting circuit, which then checks the memory address is valid, e.g. as described above, before the memory transaction is able to proceed.

In embodiments, the data processing system comprises a cache system, and data is transferred to/from memory via the cache system. The cache system may comprise a number of caches, e.g. in a hierarchical arrangement. In that case it will be appreciated that the memory address may not be provided directly from the MMU to the error-detecting circuit, but this is instead done via a cache (e.g. via an L2 cache associated with the processing unit). In that case, the error-detecting circuit is in an embodiment located (logically) after the (e.g. L2) cache, such that the error check can also detect errors in the (L2) cache itself.

For example, when the processing unit initiates a memory write operation for a set of data, the MMU obtains a respective memory address for the set of data, e.g. from the relevant memory address mapping (page table entry). The set of data is in an embodiment then written into a (e.g. L2) cache for temporary storage local to the processing unit. When data is to be evicted from the (L2) cache to the (external) memory, e.g. to free up space in the (L2) cache for new data, before the data is evicted to memory, the memory address is provided to the error-detecting circuit that checks the memory address is valid (e.g. before passing it to any second level MMU, where that is required, and/or to a controller for the external memory (write-out circuit) for causing the data to be written to the relevant memory location).

Where a hierarchy of caches are provided, an error-detecting circuit could in embodiments be associated with each cache, in order to protect each cache. In that case it may be possible to determine where the error occurred. Or, in embodiments, the error-detecting circuit may be positioned after the final cache that is closest to the memory, to detect all errors (without being able to determine where the error occurred).

When it is determined that that the memory address for the data is not valid, an error-handling operation may be performed. Any suitable and desired error-handling may be performed. In some embodiments the error-handling may comprise stopping the memory transaction, and in an embodiment re-setting the data processing system (an "active" error-handling mode). In that case, the error may be communicated to the (e.g. software) application requiring the processing unit work, e.g. to cause the application to wait until the error recovery has been performed. However, depending on the nature of the data/error, the error-handling could also allow the transaction to proceed, but generate a suitable error flag indicating that an error has occurred (a "passive" error-handling mode).

On the other hand, when it is determined that the memory address for the data is valid, the memory transaction can then (and should) proceed as normal, e.g. by writing the data to/reading the data from the memory address. Thus, in the case of a memory write operation, when the memory address is valid, the error-detecting circuit can indicate this, e.g. to the memory controller (write-out circuit), e.g. to cause the data to be written out (either by explicitly indicating this, or by virtue of allowing the data to pass to the write-out circuit, e.g. where active error-handling is being performed).

Whilst embodiments have been described above in relation to a memory write transaction, it will be appreciated that the error-detecting circuit may also be arranged to (and in an embodiment does) check memory addresses during memory read operations when data is being read into the processing unit from the memory. In that case, when the data processing unit initiates a memory read operation, the MMU is configured to determine from the respective memory address mapping (page table entry) the corresponding memory address in which the data is stored, and the error-detecting circuit is then configured to check the memory address is valid before the data is read in. When the memory address is not valid, appropriate error-handling may be performed.

Different error-handling may be performed for errors during read operations than during write operations. For instance, an erroneous memory write to a persistent data structure may require the processing unit to be reset. However, an erroneous memory read may only affect the current instance of processing. In that case, rather than resetting the data processing system, the memory transaction could be re-issued, or ignored until the next processing instance.

Various arrangements would be possible in this regard depending on the nature of the data processing system and the type of memory transaction that is impacted.

The technology described herein also extends to the operation of a data processor including a processing unit and MMU itself.

A further embodiment of the technology described herein comprises a data processor comprising:
 a processing unit;
 a memory management unit (MMU) operable to process memory transactions for the processing unit; and
 an error-detecting circuit located after the MMU;
 wherein the MMU is configured, for a memory transaction for the processing unit, to determine, from a respective memory address mapping for the memory transaction, a corresponding memory address to which the memory transaction applies,
 wherein the determined memory address comprises a first part representing a memory location to which the memory transaction applies and a second part representing an error-detecting code that has been generated for the memory address using the first part of the memory address; and
 wherein the memory address determined by the MMU is subsequently provided to the error-detecting circuit, wherein the error-detecting circuit is configured to check, using the error-detecting code for the memory address, whether the memory address received by the error-detecting circuit is valid.

Another embodiment of the technology described herein comprises a method of operating a data processor, the data processor comprising:
 a processing unit;
 a memory management unit (MMU) operable to process memory transactions for the processing unit; and
 an error-detecting circuit located after the MMU;
 the method comprising:
 for a memory transaction for the processing unit:
 the MMU determining, from a respective memory address mapping for the memory transaction, a corresponding memory address to which the memory transaction applies,
 wherein the determined memory address comprises a first part representing a memory location to which the memory transaction applies and a second part representing an error-detecting code for the memory address that has been generated using the first part of the memory address; and
 the memory address obtained by the MMU subsequently being provided to the error-detecting circuit, and the error-detecting circuit checking, using the error-detecting code for the memory address, whether the memory address received by the error-detecting circuit is valid.

Furthermore, the technology described herein also extends to an apparatus including a memory management unit (MMU) and error-detecting circuit that can be operated in the manner described above.

A further embodiment of the technology described herein comprises an apparatus comprising:
 a memory management unit (MMU) operable to process memory transactions; and
 an error-detecting circuit located after the MMU;
 wherein the MMU is configured, for a memory transaction, to determine, from a respective memory address mapping for the memory transaction, a corresponding memory address to which the memory transaction applies,
 wherein the determined memory address comprises a first part representing a memory location to which the memory transaction applies and a second part representing an error-detecting code that has been generated for the memory address using the first part of the memory address; and
 wherein the memory address determined by the MMU is subsequently provided to the error-detecting circuit, wherein the error-detecting circuit is configured to check, using the error-detecting code for the memory address, whether the memory address received by the error-detecting circuit is valid.

A further embodiment of the technology described herein comprises a method of using an apparatus comprising a memory management unit (MMU) operable to process memory transactions for the processing unit; and an error-detecting circuit located after the MMU; the method comprising:

for a memory transaction:
the MMU determining, from a respective memory address mapping for the memory transaction, a corresponding memory address to which the memory transaction applies,
wherein the determined memory address comprises a first part representing a memory location to which the memory transaction applies and a second part representing an error-detecting code for the memory address that has been generated using the first part of the memory address; and
the memory address obtained by the MMU subsequently being provided to the error-detecting circuit, and the error-detecting circuit checking, using the error-detecting code for the memory address, whether the memory address received by the error-detecting circuit is valid.

The data processor and apparatus in these embodiments may be operated in the same manner as described above.

In an embodiment, the operation in the manner of the technology described herein can be selectively activated for a given output to be generated by a processing unit. This would then allow this operation to be used where desired (e.g. in the case of use in a safety critical environment when generating a data structure that may be subject to transient faults and would not otherwise be protected from such faults), but avoid its use in those circumstances where it is not required.

This operation may be controlled, e.g., by a (software) driver for the processing unit, or an appropriate hypervisor, or "arbiter" which controls access to the processing unit. Thus, in an embodiment, the processing unit can be selectively configured to operate in the manner of the technology described herein, e.g., and in an embodiment, on an output-by-output basis.

The, e.g. driver, can recognise when operation in the manner of the technology described herein is required in any suitable and desired manner. For example, and in an embodiment, an application that requires processing by the processing unit could be configured to and operable to be able to indicate when processing in the manner of the technology described herein is required. This could be achieved, for example, and in an embodiment, by providing an appropriate API extension, whereby an application programmer can indicate that operation in the manner of the technology described herein is desired.

Other arrangements would, of course, be possible.

Subject to the requirement to be operable in accordance with the technology described herein, the processing unit (or units) of the data processing system may otherwise comprise any or all of the normal components, functional units, and elements, etc., that such a processing unit may comprise. Each processing unit may have the same set of functional units, etc., or some or all of the processing units may differ from each other.

Thus, in the case of graphics processing units, for example, each graphics processing unit in an embodiment includes one or more execution units, such as one or more shader (programmable processing) cores. In an embodiment, each graphics processing unit includes a plurality of shader cores, such as three or four shader cores.

In an embodiment, the graphics processing units (and thus the graphics processing system) are tile-based graphics processing units, and one or more of (e.g. all of) the graphics processing units also includes a tiling unit (a tiler or hierarchical tiler).

The processing unit may be operated to perform processing under the control of a host processor (e.g. CPU). The host processor can be any suitable and desired host processor of a data processing system. The host processor can, and in an embodiment does, execute applications that may require graphics processing by the graphics processor, and includes and executes an appropriate driver (e.g. including a compiler) for the graphics processor, such that it can prepare commands, instructions, data structures, etc., for execution and use by the graphics processor to perform desired graphics processing operations in response to requests for graphics processing operations from applications that are executing on the host processor.

The processing unit in an embodiment also comprises one or more of, and in an embodiment all of: a management unit (e.g. a job manager) that provides a host processor (or virtual machine) (software) interface for the graphics processing unit and is also operable to divide a data processing task allocated to the graphics processing unit into subtasks and to distribute the subtasks for execution to the execution unit or units of the graphics processing unit; a cache (e.g. a L2 cache) that provides an interface to an external (main) system memory of the data processing system, and a memory management unit (MMU) (however, appropriate memory management units could also or instead be located externally to the graphics processing unit or units, if desired).

Each graphics processing unit will also comprise an appropriate communications network for providing communications between the various units of the graphics processing unit, such as memory transactions between execution units and/or the cache of the graphics processing unit, subtask control traffic between the job manager and execution units and so on.

Other configurations of graphics processing unit would, of course, be possible.

As well as the processing units, controller, etc., necessary for operation in the manner of the technology described herein, the data processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.).

In embodiments, where the data processing system includes a plurality of processing units (which may either be operated independently of each other or in combination), each processing unit can in an embodiment receive processing instructions, e.g. from a (driver that is executing on a) host processor or virtual machine that requires the data processing output, and carry out received instructions independently. For example, each processing unit in an embodiment has an associated (task) management circuit (e.g. job manager) that can provide a suitable software interface for the processing unit when operating in standalone mode. In an embodiment at least some of the processing units can also be operated in combination, e.g. in a master-and-slave arrangement.

The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in an embodiment includes appropriate (system) memory for storing the data used by the processing units when carrying out processing and/or for storing the data generated by the processing units as a result of carrying out processing. Different groups of processing units may be configured to be connected to the same (system) memory, or separate system memories may be provided for different groups (again, this may be beneficial for safety and/or security purposes).

Correspondingly, different groups of the processing units may be connected to the external system memory via the same or different memory interconnects.

Thus, in an embodiment, the data processing system includes the processing units, and one or more host data processing units (processors) (e.g. central processing units) on which one or more virtual machines execute (in an embodiment together with one or more drivers (for the processing units)).

In an embodiment, the data processing system and/or data processing units comprise, and/or are in communication with, one or more memories and/or memory devices that store the data described herein, and/or that store software for performing the processes described herein.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows an exemplary data processing system 100 that can be operated in accordance with the embodiments of the technology described herein.

As shown in FIG. 1, the data processing system 100 includes a central processing unit (CPU) 102, a graphics processor (graphics processing unit) (GPU) 101, an image signal processor (ISP) 106 (coupled to a camera 107), and a display controller 103, that communicate via an interconnect 104. The CPU, GPU, ISP and display controller also have access to off-chip memory 130 for storing, inter alia, frames to be displayed, via a memory controller 105.

The GPU 101 produces an output data array. The output data array may be an output frame intended for display on a display device, such as a screen or printer, but may also, for example, comprise any other suitable output of the graphics processor, such as a "render to texture" output of the graphics processor, etc.

In use, the GPU 101 will, for example, generate a sequence of frames for display, which are stored via the memory controller 105 in a frame buffer in the off-chip memory 130. Then, when the frames are to be displayed, the display controller 103 will read the frames from the frame buffer in the off-chip memory 130 via the memory controller 105 and send them to a display 120 for display.

Although FIG. 1 only shows a single GPU 101 it will be appreciated that the data processing system 100 may generally include more than one GPU, e.g. arranged in a group, e.g. and operable either independently or in combination, e.g. in a master-and-slave arrangement. Likewise the system in FIG. 1 only shows certain elements of a data processing system but the data processing system may generally contain any other desired units that a data processing system may comprise.

The present embodiments relate in particular to the operation of a data processing system such as that shown in FIG. 1 where the graphics processor 101 is being used to render frames for display for a safety-critical application (in a safety-critical environment). Such applications may be where the data processing system shown in FIG. 1 is being used to render images for display in a vehicle, such as for a vehicle cockpit display or as an automotive mirror replacement system. Other safety-critical applications that a data processing system may be used to render frames for display for include, for example, for use in medical applications, such as when rendering images for display from medical devices, such as endoscopes.

In this respect, the technology described herein recognises and is particularly concerned with the presence of "transient" faults occurring during memory transactions, and especially memory write operations, that may impact on "persistent" data structures in memory, e.g. that may be used for rendering multiple frames (as opposed to "one-off" data structures such as the framebuffer for a particular frame, which will typically be redrawn when the next frame is to be rendered). Such faults may not otherwise easily be detected. The present embodiment thus provides an efficient mechanism for addressing these faults, as will now be explained.

Figure 2:
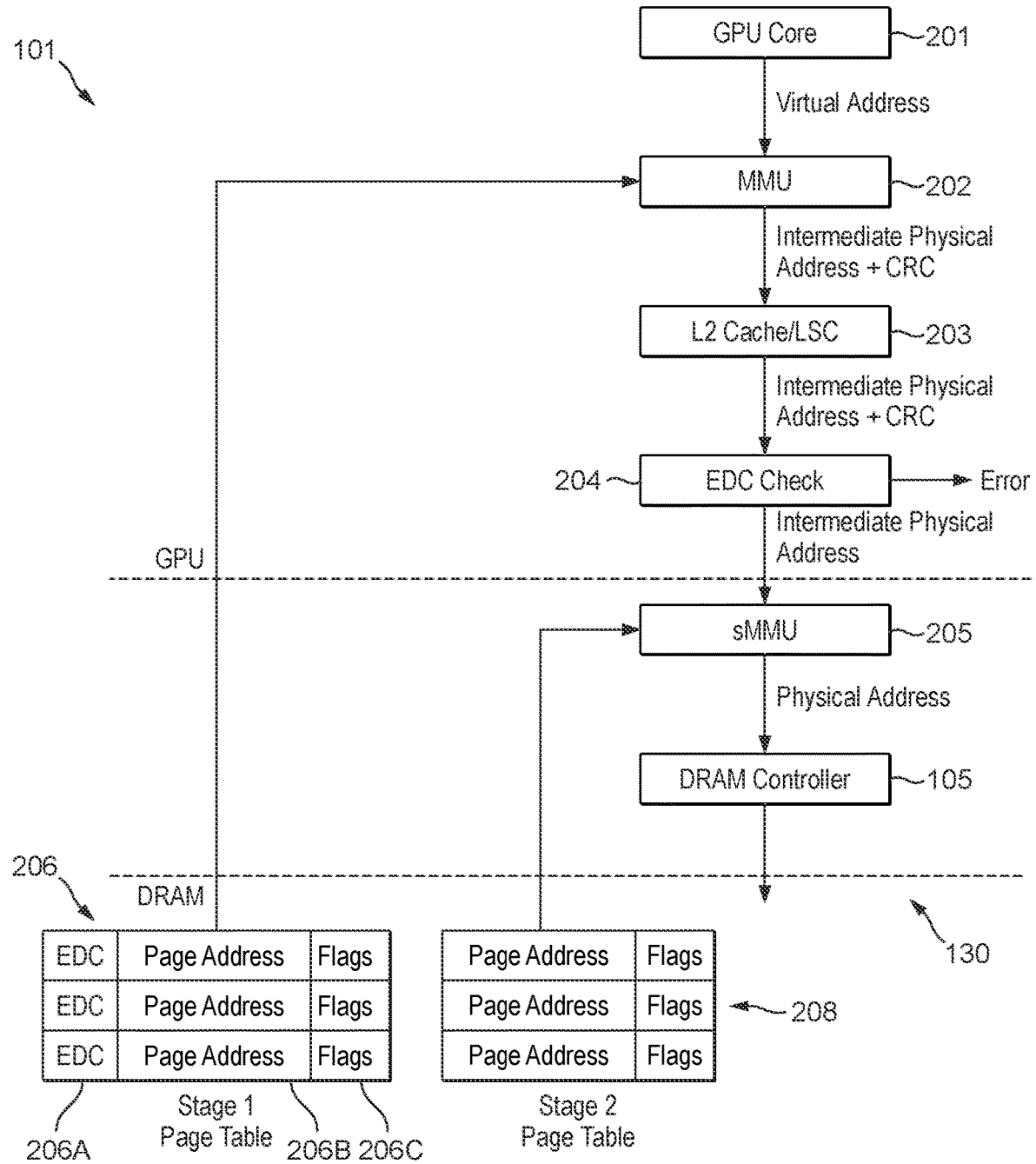
FIG. 2 shows a memory transaction according to an embodiment.

FIG. 2 shows an example of a memory transaction within a data processing system, e.g. the data processing system 100 shown in FIG. 1, according to the present embodiment.

For example, as explained above, the GPU 101 will, in use, generate data that needs to be written out to the off-chip memory 130, e.g. for storage. In that case, the GPU 101 may initiate a memory write operation for writing out data generated by the GPU 101 to external memory 130. Correspondingly, when the processing at the GPU 101 requires data that is stored in memory, the GPU 101 may initiate a memory read operation for reading in data from its location in the external memory 130. In the present embodiment such memory transactions are controlled by a memory management unit (MMU) 202 of the GPU 101, e.g. in the normal way for a MMU.

Thus, as shown in FIG. 2, the GPU 101 includes one or more processing core 201 that is operable to process data to generate a render output (e.g. a frame). When the graphics processing operations performed at the processing 201 require data to be written out to (or read in from) memory, a memory transaction is initiated, which is then passed to the MMU 202 that is then configured to determine the memory address to which the memory transaction relates.

To do this, the MMU 202 is configured to determine from the relevant memory page tables the corresponding memory address for the memory transaction in question. In particular, for a given memory transaction initiated by the GPU 101 for a (set of) data, the processing core 201 provides the virtual address where the data is to be stored to the MMU 202 which then performs the required virtual address-to-physical address mapping (translation) to determine the corresponding memory address in external memory 130 to which the memory transaction applies.

In the present embodiment the memory address translation is performed over two levels. Thus, as shown in FIG. 2, the MMU 202 is configured to first determine an 'intermediate' physical memory address for the memory transaction from a respective first level page table 206 in memory. The intermediate physical memory address determined by the MMU 202 is then passed through the system to allow the data to be written out/read in accordingly.

In FIG. 2, the GPU 101 includes an L2 cache 203 between the MMU 202 and the memory, and data is transferred to/from the external memory 130 via the L2 cache 203. Thus, in the case of a memory write operation, for example, the data is first written into the L2 cache 203, and held locally on the GPU 101. However, eventually, the data may need to be evicted from the L2 cache 203, and written out to external memory 130.

In the present embodiment, before writing the data out from the L2 cache 203 to memory 130 (in general, before a memory transaction is allowed to proceed), the GPU 101 is configured to perform an error check on the intermediate memory address for the memory transaction that was provided the MMU 202. To do this, an error-detecting circuit (EDC Check) 204 is thus provided on the GPU 101 between the L2 cache 203 and the memory that is configured to check that the intermediate physical address determined by the MMU 202 is 'valid' (e.g. has not been corrupted or otherwise modified by a fault in the GPU 101) before the memory transaction is allowed to proceed.

When the error check is passed, e.g. such that the intermediate memory address is determined to be valid, the memory transaction is allowed to proceed as normal. Thus, as shown in FIG. 2, in which two level memory addressing is used, when the intermediate physical address is determined to be valid, the intermediate physical address is then passed to a second level MMU 205 which determines the final second level memory address from a second level memory address mapping stored in a second level page table 208, and the data is then written to the memory location (or read in therefrom) via an external memory controller 105.

On the other hand, when the error check is not passed, such that the intermediate memory address is determined to be invalid, an error flag may be generated and appropriate error handling performed. For instance, the error handling may comprise stopping the write operation and re-setting the GPU 101 ("active" error handling). However, it would also be possible to perform "passive" error handling where the error is simply flagged at this stage but the memory transaction is allowed to proceed.

To facilitate this error check the intermediate memory addresses stored in the first level page table 206 are configured to include an error detecting code 206A, in particular in the form of a number of error-detecting code (EDC) bits, as shown in FIG. 2. The error-detecting code (EDC) bits are generated using a subset of bits from the memory address field 206B itself, as well as a value generated using the access permission bits that are also stored for the memory address. The access permission may, e.g., be stored along with any other such information, in a number of other fields, or flags 206C.

After the MMU 202 has determined an intermediate memory address for a memory transaction from the first level page table 206, the intermediate memory address including the error-detecting code 206A and the memory address 206B is then provided to the error-detecting circuit (EDC Check) 204 (via the L2 cache 203). The error-detecting circuit (EDC Check) 204 is then able test the memory address accordingly using the error detecting code 206A as well as the memory address 206B, as will be explained further below.

In this embodiment it is only the first level page table 206 entries that are configured in this way, to include the error-detecting code 206A, whereas the second level page table 208 does not include an error-detecting code (but only includes the second level address 208B and associated flags 208C). However, the same principles could also be applied to the second level page table, if desired.

A worked example of the configuration of the first level page table 206 to include the error detecting code, and the subsequent error checking using the error detecting code, will now be provided for illustrative purposes. Other examples would of course be possible.

In this example, there is 64-bit page table entry, indexed from 0 to 63, which is configured as follows:

| Bit Position(s) | Data |
|---|---|
| 0:1 | PT - Page Type |
| 2:4 | ATR - Attributes (e.g. cacheability) |
| 5 | — |
| 6:7 | AP - Access Permissions |
| 8:9 | SH - Shareability |
| 10:11 | — |
| 12:36 | PA - Memory address[12:36] |
| 37:39 | EDC bits [0:2] |
| 40:63 | — |

Thus, it can be seen that bits 12:36 are used to represent the memory address itself (e.g. representing the actual memory location to which the memory address mapping relates), and bits 6 and 7 are used to represent the access permissions. The other bits are used for various other fields, which are not used for the purposes of the present example (or are 'free' bits that are not used at all in this example). In general any other information that may desirably be stored in the address field can be stored in such fields (and correspondingly any of these fields may be omitted or replaced with other fields, if desired).

Bits 37:39 are then used to store three error detecting code (EDC) bits, the values of which are determined using a respective different (unique) subset of address bits, e.g. as follows:
EDC[0]=XNOR({PA[12,15,18,21,24,27,30,33,36], WP})
EDC[1]=XNOR({PA[13,16,19,22,25,28,31,34], WP})
EDC[2]=XNOR({PA[14,17,20,23,26,29,32,35], WP})
where (in Verilog coding):
WP=(AP==2'b01?1'b1:1'b0)
wherein AP (two-bit access permissions) may be 0, 1, 2 or 3, and wherein if AP==1, then WP (write permission)=1 (write operation is permitted), else WP=0.

Thus, each error-detecting code (EDC) bit value is generated from an XNOR across a respective unique subset of bits from the memory address 206B as well as the write permission (WP).

When the memory address including the EDC bits (bits 37:39) is provided to the error-detecting circuit 204, a set of respective error checks is then performed for the set of EDC bits wherein each error check comprises computing an XNOR across the respective EDC bit value with the respective memory address bits for which the EDC bit value was derived, e.g. as follows:
err_chk[0]=XNOR({PA[12,15,18,21,24,27,30,33,36,37]})
err_chk[1]=XNOR({PA[13,16,19,22,25,28,31,34,38]})
err_chk[2]=XNOR({PA[14,17,20,23,26,29,32,35,39]})

The effect of these error checks is thus to perform, for each of the EDC bit values, a parity check on the combination of the EDC bit value and the respective memory address bits for which the EDC bit value was derived.

In particular, in the present embodiment, the EDC bit value is set to '1' if there are an even number of '1's in the set of bits it is being derived for.

For example, if the WP bit is set (WP=1), and there are an odd number of '1's in the respective subset of address bits used to generate the EDC bit value, the EDC bit value is set to '1'. On the other hand, where the WP is set (WP=1) but there are an even number of '1's in the respective subset of address bits used to generate the EDC bit value, the EDC bit value is set to '0'. This is illustrated in Table 1 below.

TABLE 1

Generating EDC bits when write permission is set

| | | |
|---|---|---|
| EDC = 1 | PA = odd number of '1's | WP = 1 |
| EDC = 0 | PA = even number of '1's | WP = 1 |

This means that in the case where the write permission was set (WP=1) the combination of the EDC bit with its respective address bits should always contain an even number of '1's. Thus, when an error check is performed across the combination of a respective one of the EDC bits and its respective address bits, for a normal (error free) memory write operation for which the write permission has been set (writing is permitted), the result of the error check should be '1' (since the error check is set to '1' if there are an even number of '1's in the set of bits it is being derived for).

Accordingly, in the present embodiment, the error check on the write channel determines that there is an error if any of the error checks give an zero result (as this would indicate that there are an odd number of '1's in the combination of the EDC bit with its respective address bits). An error on the write channel may thus be determined, e.g. as follows:
Error=nand(err_chk[2:0]).

Correspondingly, if the WP bit is not set (WP=0), the EDC bit is set to '1' if there are an even number of '1's in the respective subset of address bits used to generate the EDC bit value, whereas the EDC bit value is set to '0' of there are an odd number of '1's in the respective subset of address bits used to generate the EDC bit value. This is illustrated in Table 2 below.

TABLE 2

Generating EDC bits when write permission is not set

| | | |
|---|---|---|
| EDC = 0 | PA = odd number of '1's | WP = 0 |
| EDC = 1 | PA = even number of '1's | WP = 0 |

Thus, in the case where the write permission bit is not set, the combination of the EDC bit and its respective set of address bits should always contain an odd number of '1's.

Thus, when an error check is performed across the combination of a respective one of the EDC bits and its respective address bits, and the write permission has not been set, for a normal (error free) memory (read) operation, the result of the error check should be '0'.

As mentioned above, the error check on the write channel only determines a memory address for a transaction to be valid if all of the error checks are set to '1' (or in other words that there are an even number of '1's for each combination of EDC bit and its respective address bits), and in that way checks firstly that the memory address is valid, but also that the write permission has been set. However, for a memory read operation, it does not matter whether a write permission was set for the read operation to be valid.

Thus, the error check on the read channel can ignore the write permission, and a read may be determined to valid in both of the situations described above, i.e. when all of the error checks are odd or when all of the error checks are even. An error on the read channel may thus be determined, e.g. as follows:

Error=nand(err_chk[2:0]) and or(err_chk[2:0]).

It will be appreciated that the above is merely one example for how the error checking can be performed, and how the EDC bits can be generated accordingly to facilities the error checks. However, various other arrangements would be possible.

For instance, the effect of the above is to set the EDC bits to '1' if there is an even number of bits in the set of bits it is being derived for (the respective subset of address bits and the write permission bit (WP)), e.g. such that when the write permission is set there should always be an even number of '1's when the EDC bit is combined with the address bits for which it was derived, etc. However, in another implementation, the EDC bits may be set to '1' if there is an odd number of bits in the set of bits it is being derived for, in which case the parity check is configured to give the opposite results.

Moreover, any other suitable cyclic redundancy check could be performed, and it is not necessary to use a parity check.

For example, as another example, the error-detecting circuit may be configured to compare the values of the CRC bits in the memory address provided by the MMU with corresponding values that are generated by the error-detecting circuit in the GPU itself. This operation could thus be performed more directly, e.g. by having the error-detecting circuit generate its own values for the CRC bits (in which case the access permission bits should also be carried through the data processing system along with the memory address) and then compare these with the CRC bits in the memory address provided by the MMU.

However, in that case, it may be necessary to also carry the access permission bits through the data processing system as part of the memory address, therefore reducing the available bits for representing the memory location itself.

Any other suitable error checking and error-detecting codes may also be used, as desired.

Figure 3:
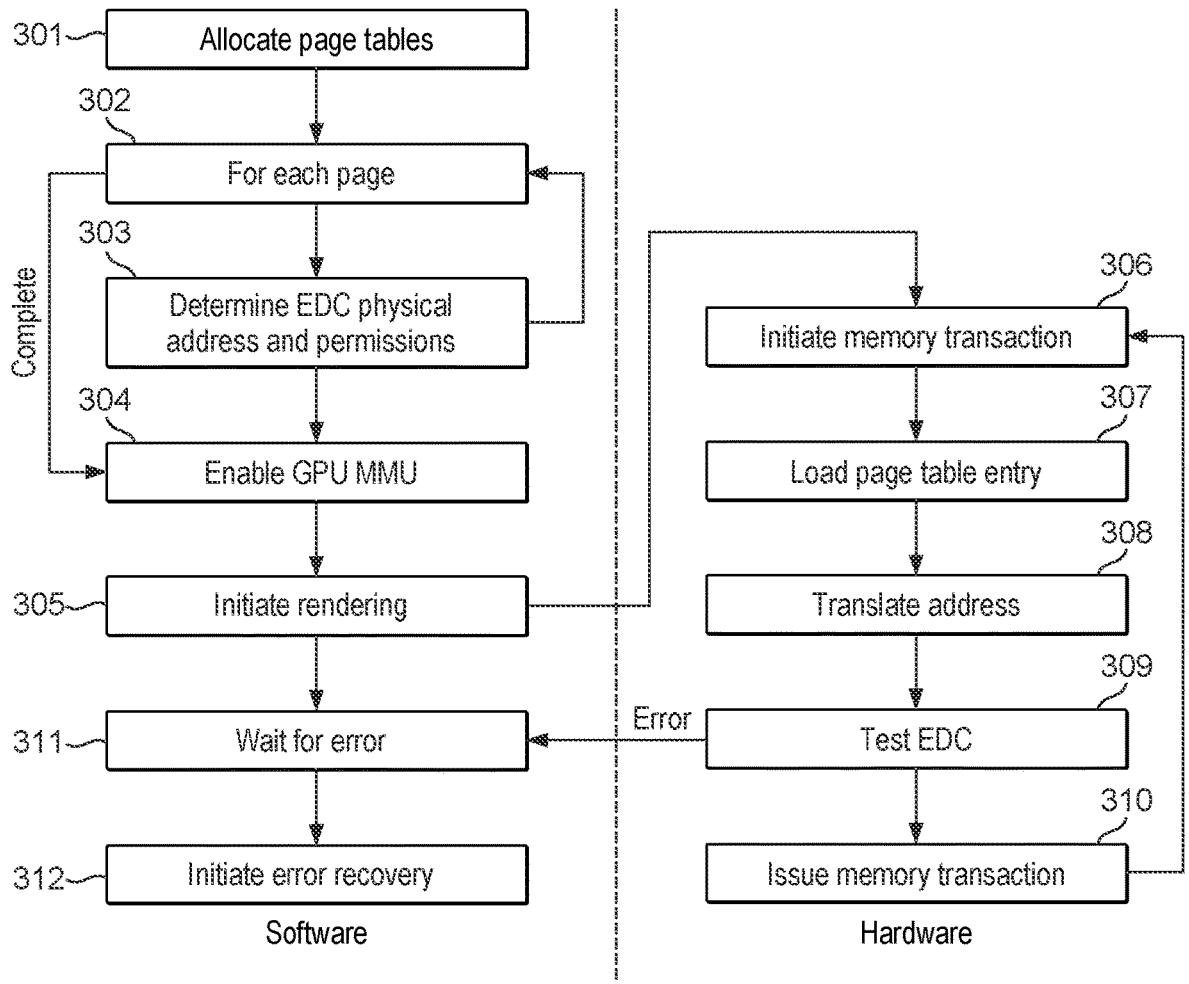
FIG. 3 is a flow chart showing the operation of a data processing system according to an embodiment.

FIG. 3 shows the overall operation of a data processing system according to the present embodiment.

Firstly, the software driver allocates the memory page tables (step 301), and for each page (step 302), the software configures the memory addresses accordingly, e.g. by determining the virtual address to physical address translation, as well as the write permissions, etc., for the memory address, and then determining the CRC 206A for the memory address (step 303), e.g. as described above. Once all of the memory pages have been configured, the GPU MMU is then enabled accordingly (step 304).

The GPU can then start rendering data (step 305). During the graphics processing operations, data may need to be written out to memory, e.g. for storage. To do this, the GPU initiates a memory write transaction (step 306).

The relevant page table entry is then loaded (step 307) and a virtual address provided by the processing core is then translated to the desired physical memory address using the page table (step 308).

The obtained physical memory address can then be tested by the error-detecting circuit (CRC check) 204, e.g. in the manner described above (step 309). If the test is passed, the memory transaction can then be issued as normal (step 310).

On the other hand, if the test indicates an error, the transaction is not allowed to proceed, and is terminated, and this may be indicated to a software error handler which is monitoring for errors (step 311) and initiates error recovery when an error is detected (step 312).

Figure 4:
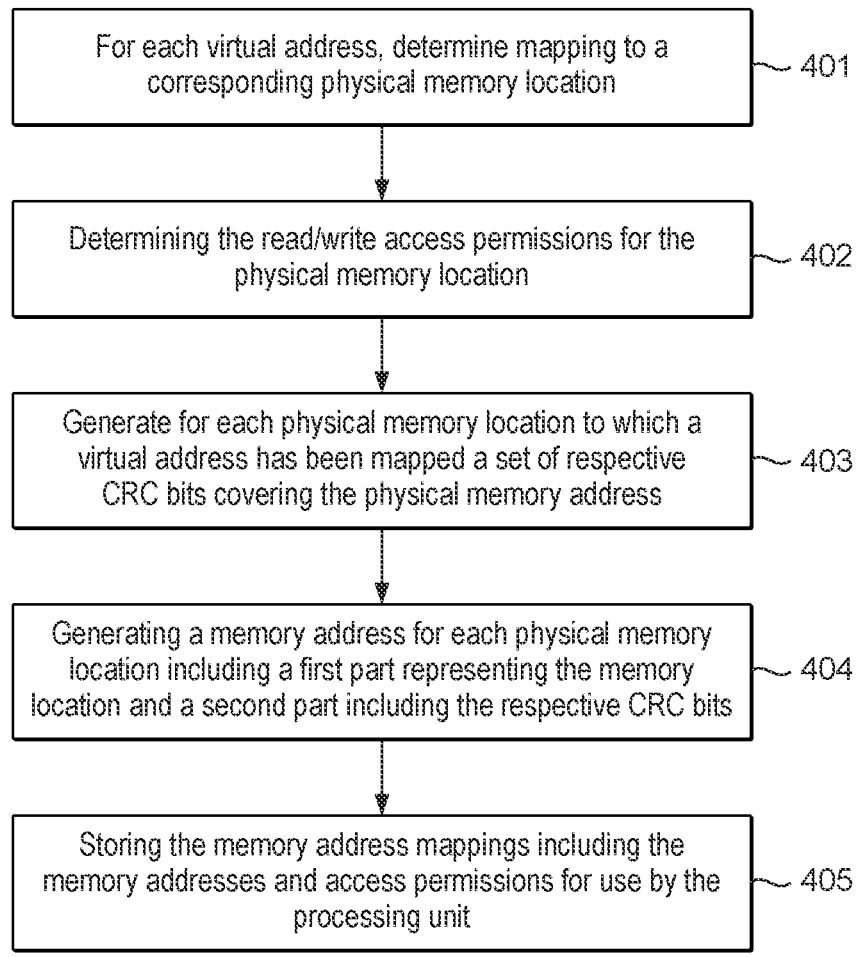
FIG. 4 is a flow chart showing in more detail the configuration of the memory address mappings according to an embodiment.

FIG. 4 shows in more detail how the memory pages can be configured according to an embodiment. In particular, the page table configuration comprises, for each of a set of virtual addresses that are available to be used by the processing unit, determining a respective virtual address-to-physical address translation (i.e. a mapping between the virtual address and a corresponding physical memory location) (step 401). The access permissions, and any other state or flags associated with the memory location are then determined (step 402), and a respective set of CRC bits covering the memory location and access permissions are then generated (step 403), e.g. as explained above.

For each memory address mapping, a corresponding memory address is thus generated including a first part representing the memory location and a second part including the respective CRC bits (step 404). The memory address mappings including the memory addresses as well as any other state or flags (such as the access permissions, etc.) can then be stored appropriately, e.g. in a memory page table, for access and use by the processing unit (step 405).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein described herein, in various embodiments and with various modifications as are suited to the particular use contemplated. It is intended that the scope be defined by the claims appended hereto.

The invention claimed is:

1. An apparatus comprising:
a memory management unit (MMU) operable to process memory transactions, wherein a memory transaction involves translating a virtual address to a corresponding memory address using a respective memory address mapping, wherein the memory addresses and memory address mappings are configured in advance and the memory addresses can be obtained from a respective data structure for storing the memory addresses that is external to the MMU such that the MMU, when processing a memory transaction, is operable to determine the respective memory address mapping for the memory transaction, and then obtain the corresponding memory address to which the memory transaction applies from the respective data structure for storing the memory addresses that is external to the MMU, wherein the memory addresses that are obtained from the respective data structure for storing the memory addresses that is external to the MMU comprise a first part representing a memory location to which the memory transaction applies and a second part representing an error-detecting code that has been generated for the memory address using the first part of the memory address;

the apparatus further comprising:

an error-detecting circuit located after the MMU;

wherein the MMU is configured, for a memory transaction, to determine the respective memory address mapping for the memory transaction, and to use the determined memory address mapping to obtain from the respective data structure for storing the memory addresses that is external to the MMU the corresponding memory address to which the memory transaction applies, the memory address obtained by the MMU from the respective data structure for storing the memory addresses that is external to the MMU using the respective memory address mapping determined for the memory transaction thus comprising a first part representing a memory location to which the memory transaction applies and a second part representing an error-detecting code that has been generated for the memory address using the first part of the memory address; and wherein the memory address determined by the MMU is subsequently provided to the error-detecting circuit, wherein the error-detecting circuit is configured to check, using the error-detecting code for the memory address, whether the memory address received by the error-detecting circuit is valid.

2. The apparatus of claim 1, wherein the error-detecting circuit is configured to check whether the memory address provided by the MMU is valid by performing a parity check using the first and second parts of the memory address.

3. The apparatus of claim 1, wherein the error-detecting code is generated for the memory address using at least a subset of bits from the first part of the memory address and using a set of bits representing the access permissions for the memory address.

4. The apparatus of claim 1, wherein when the error-detecting circuit determines that the memory address is valid, the memory transaction is allowed to proceed.

5. The apparatus of claim 1, wherein when the error-detecting circuit determines that the memory address is not valid, the apparatus is caused to perform an error handling operation.

6. The apparatus of claim 1, further comprising: a memory and a processing unit, wherein the error-detecting circuit located between the MMU and the memory.

7. The apparatus of claim 6, wherein the processing unit comprises a graphics processing unit.

8. The apparatus of claim 6, further comprising a cache located between the MMU and the memory, and arranged such that data is transferred between the processing unit and the memory via the cache, wherein the error-detecting circuit is located after the cache such that the error-detecting circuit is located between the cache and the memory.

9. The apparatus of claim 6, wherein the memory address mappings are stored in a respective memory page table in memory, and wherein the memory address mappings are configured in advance of the processing.

10. A method of operating an apparatus comprising a memory management unit (MMU) operable to process memory transactions; and an error-detecting circuit located after the MMU, wherein a memory transaction involves translating a virtual address to a corresponding memory address using a respective memory address mapping, wherein the memory addresses and memory address mappings are configured in advance and the memory addresses can be obtained from a respective data structure for storing the memory addresses that is external to the MMU such that the MMU, when processing a memory transaction, is operable to determine the respective memory address mapping for the memory transaction, and then obtain the corresponding memory address to which the memory transaction applies from the respective data structure for storing the memory addresses that is external to the MMU, wherein the memory addresses that are obtained from the respective data structure for storing the memory addresses that is external to the MMU comprise a first part representing a memory location to which the memory transaction applies and a second part representing an error-detecting code that has been generated for the memory address using the first part of the memory address;

the method comprising:

for a memory transaction:

the MMU determining a respective memory address mapping for the memory transaction, and using the determined memory address mapping to obtain from the respective data structure for storing the memory addresses that is external to the MMU the corresponding memory address to which the memory transaction applies, the memory address obtained by the MMU from the respective data structure for storing the memory addresses that is external to the MMU using the respective memory address mapping determined for the memory transaction thus comprising a first part representing a memory location to which the memory transaction applies and a second part representing an error-detecting code for the memory address that has been generated using the first part of the memory address; and the memory address obtained by the MMU subsequently being provided to the error-detecting circuit, and the error-detecting circuit checking, using the error-detecting code for the memory address, whether the memory address received by the error-detecting circuit is valid.

11. The method of claim 10, wherein the error-detecting circuit is configured to check whether the memory address provided by the MMU is valid by performing a parity check using the first and second parts of the memory address.

12. The method of claim 10, wherein the error-detecting code is generated for the memory address using at least subset of bits from the first part of the memory address and using a set of bits representing access permissions for the memory address.

13. The method of claim 10, wherein when the error-detecting circuit determines that the memory address is valid, the memory transaction is allowed to proceed.

14. The method of claim 10, wherein when the error-detecting circuit determines that the memory address is not valid, the apparatus performs an error handling operation.

15. The method of claim 10, wherein the apparatus further comprises a processing unit and a memory, and wherein the error-detecting circuit is located between the MMU and the memory.

16. The method of claim 15, wherein the processing unit comprises a graphics processing unit.

17. The method of claim 15, further comprising a cache located between the MMU and the memory, and arranged such that data is transferred between the processing unit and the memory via the cache, wherein the error-detecting circuit is located after the cache such that the error-detecting circuit is located between the cache and the memory.

18. The method of claim 15, wherein the memory address mappings are stored in a respective memory page table in memory, and wherein the memory address mappings are configured in advance of the processing.

19. A method of configuring a set of memory address mappings for use by a memory management unit (MMU) associated with a processing unit of a data processing system, the method comprising:

determining, for each of a plurality of virtual addresses to be used by the processing unit, a respective mapping to a corresponding physical memory location;

generating a memory address for the physical memory location to which the memory address mapping applies for use by the MMU when determining the respective memory address mapping for a memory transaction, wherein the generated memory address comprises a first part representing the physical memory location and a second part representing an error-detecting code that has been generated for the memory address using the first part; and storing the generated memory address in a respective data structure from which it can be obtained by the MMU when processing a memory transaction.

20. The method of claim 19, being performed by software code executing on a data processor, wherein the software code is stored on a non-transitory computer readable storage medium.

* * * * *